Figure 1:
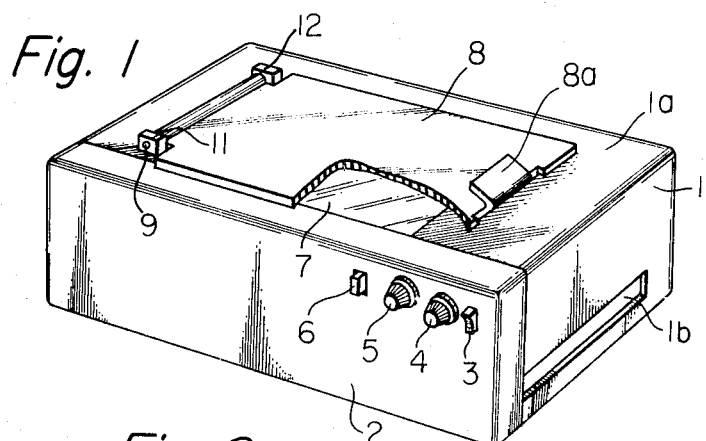

United States Patent
Suzuki

[15] 3,682,548
[45] Aug. 8, 0197

[54] ORIGINAL HOLDER PLATE FOR COPYING MACHINES

[72] Inventor: Shigeru Suzuki, Yokohama, Japan

[73] Assignee: Kabushiki Kaisha Ricoh, Tokyo, Japan

[22] Filed: June 5, 1970

[21] Appl. No.: 43,713

[30] Foreign Application Priority Data

June 10, 1969 Japan ..................... 44/45605

[52] U.S. Cl. .................. 355/113, 264/255, 355/118
[51] Int. Cl. ............................................. G03b 27/62
[58] Field of Search ......... 355/118, 8, 75, 76, 81, 84, 355/99, 113; 264/255

[56] References Cited

UNITED STATES PATENTS 3,062,110  11/1962  Shepardson et al. ........ 355/11
2,146,886  2/1939   Drotning ................... 355/118
2,226,157  12/1940  Christie et al. ............. 355/113

Primary Examiner—Samuel S. Matthews
Assistant Examiner—Richard A. Wintercorn
Attorney—Craig, Antonelli and Hill

[57] ABSTRACT

An original holder plate for copying machines and a method for preparing said plate are provided. Said original holder plate comprises a molded base having a closed projecting rim, an original holding flexible layer partitioned by said closed projecting rim, an outer flexible layer covering said layer and a molded cover further covering said outer layer. To prepare said original holder plate, a closed projecting rim is made on a molded base, rubber or synthetic resin is poured into the space divided by said closed projecting rim to form an original holding layer, other rubber or synthetic resin is poured all over said layer to form an outer layer, a molded cover is mounted to cover said outer layer, and said molded base, said two layers and said molded cover are vulcanized and casted. A handle is made at one end of said original holder plate integrally, and said original holder plate is mounted to a copying machine with two protruding shafts embedded integrally on the other end of said original holder plate.

3 Claims, 10 Drawing Figures

PATENTED AUG 8 1972

3,682,548

SHEET 1 OF 2

INVENTOR
SHIGERU SUZUKI
BY
Craig, Antonelli, Stewart & Hill
ATTORNEYS

INVENTOR
SHIGERU SUZUKI
BY
Craig, Antonelli, Stewart & Hill
ATTORNEYS

ORIGINAL HOLDER PLATE FOR COPYING MACHINES

This invention relates to an original holder plate for copying machines and a method for preparing said plate.

In the case that the whole original holder plate is made of white rubber, the design is not good owing to its monotonous color, and stains on its surface look horribly dirty. On the other hand, if the whole plate is made of rubber of another color and only its lower side to come into contact with an original is coated with a white paint, an additional process will be required therefor, and the white paint will be worn off as it is used for a long time so that image exposure will not be effected normally. Further, in the case that an original holder plate comprises a rubber plate for its outer surface and a white rubber plate for its original holder surface, both of which are adhered to each other, it is impossible to obtain a satisfactory original holder plate for copying machines as it is extremely difficult to adhere rubber plates together rigidly.

Further, to attach the original holder plate to the copying machine, a separate metal element is fixed to the whole of one end of the original holder plate and consequently, it is not easy to mount the original holder plate to the copying machine and detach it therefrom. Furthermore, it requires considerable labor for the process of making such an original holder plate.

Further, as a handle of the original holder plate, a separate handle made of different synthetic resin or metal is fixed to one end of the holder plate. To attach it to the holder plate, however, an additional process is required and it has been found that a metal handle might damage the top panel of the copying machine or originals.

Therefore, an object of this invention is to provide an original holder plate for copying machines, which overcomes the above-mentioned defects of existing copying machines.

Another object of this invention is to provide a method for preparing said original holder plate for copying machines.

Figure 2:
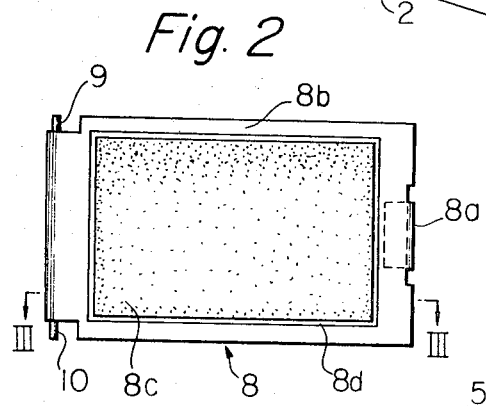
Figure 6:
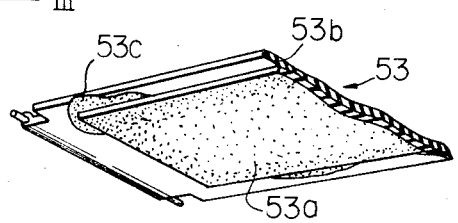
Figure 3:
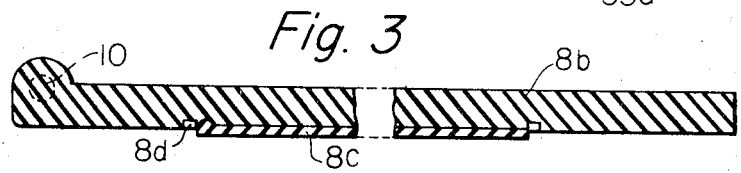
Figure 4:
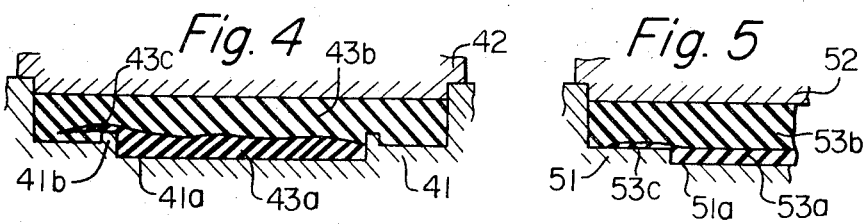
Figure 5:
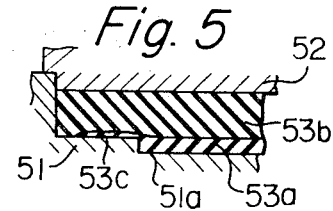
Figure 7:
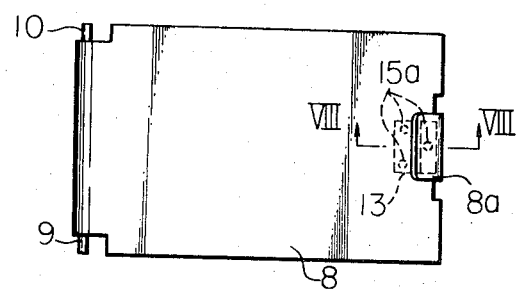
Figure 8:
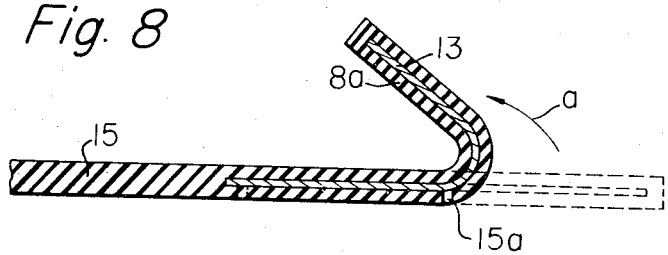
Figure 9:
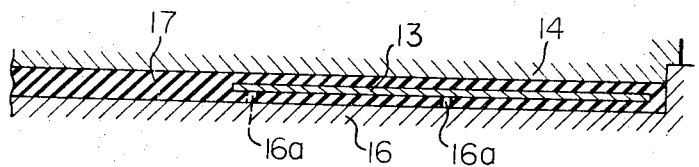
Figure 10:
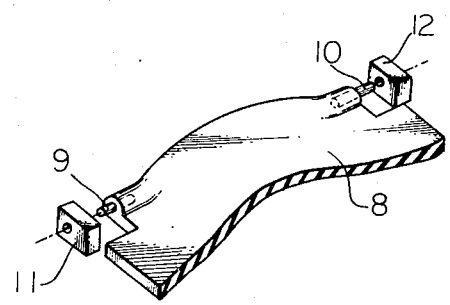

For a better understanding of the invention as well as other objects and further features thereof, reference is made to the following detailed disclosure of this invention taken in conjunction with the accompanying drawings wherein:

FIG. 1 denotes a perspective view of a copying machine equipped with an original holder plate of this invention;

FIG. 2 denotes a bottom view of said original holder plate of this invention;

FIG. 3 denotes an enlarged cross sectional view of said original holder plate taken along line III—III of FIG. 2;

FIG. 4 denotes a cross sectional view of a part of an original holder plate in the process of forming it by vulcanization in accordance with the method of this invention;

FIG. 5 denotes a cross sectional view of a part of an original holder plate in the process of forming it by vulcanization in accordance with a conventional method;

FIG. 6 denotes a perspective view of a part of the original holder plate made in accordance with the conventional method shown in FIG. 5;

FIG. 7 denotes a plan view of another original holder plate of the present invention;

FIG. 8 denotes an enlarged cross sectional view of said original holder plate taken along line VIII—VIII of FIG. 7;

FIG. 9 denotes a cross sectional view of said original holder plate, illustrating an example of formation of said plate by vulcanization; and FIG. 10 denotes a perspective view showing how an original holder plate is mounted to and detached from the copying machine.

The original holder plate of this invention is mounted, for example, to a reflex-type copying machine, as shown in FIG. 1. A front panel 2 is mounted to a copying machine housing 1 detachably. A main switch 3 mounted on said front panel 2, an exposure adjusting knob 4, a knob 5 for specifying the number of times of copying, and a switch 6 for starting copying are mounted to said front panel 2. A transparent table 7 is made of glass or the like and an original is positioned thereon. All the edges of said original table are fixed to a top panel 1a of said housing 1.

On said original table 7, a flexible original holder plate 8 made of rubber, synthetic resin or the like is mounted with mounting shafts 9 and 10 embedded on both sides of an end of said plate 8 and mounted loosely to two bearings 11 and 12 respectively. Said original holder plate 8 is sufficiently large to cover the whole surface of said original table 7, and is thick and heavy so that it may press flat an original placed on the table 7 (not shown in FIG. 2) with its own weight.

Since the plate 8 is flexible, it comes into intimate contact with the original even if said original is a nonplanar material like a book, and said original is pressed against the surface of the original table 7 intimately. A handle 8a is mounted on the free end of said original holder plate 8 so that originals may be replaced easily by raising said handle 8a of the plate 8.

Inside said copying machine housing 1, there are contained various devices for use in electrophotographic reproduction, such as photosensitive paper, a paper feeder device, a paper cutting device, a charging device, an exposure device, a developing device and a fixing device (all of which are not shown in the drawings). After an original is placed on the original table 7 and is kept in close contact with the surface of the original table 7 through the weight of the original holder plate 8, when the main switch 3 and the starting switch 6 are pushed on, the above-mentioned devices are operated to make copies of the original, and copied sheets of paper are discharged through an outlet 1b (FIG. 1).

The original put on the table 7 is exposed to light by said exposure device, and the reflected light is projected upon the charged photosensitive paper. The lower side of the original holder plate 8 is a white mat surface on which the light is reflected diffusively so that the image on a transparent or translucent original may be projected and focused onto the photosensitive paper effectively and the circumference of a copy of a small original may not be blackened.

FIGS. 5 and 6 denote a conventional original holder plate 53 which comprises a molded base 51 having a recessed flat surface 51a for holding an original, a flat molded cover 52, a white blended rubber layer 53a for holding said original inserted in said recess 51a, and a colored blended rubber layer 53b for the outer surface of the holder plate, all of them being vulcanized and molded. This original holder plate 53 has an advantage that both rubber layers 53a and 53b are formed integrally, but the white rubber layer 53a on the holding side flows over into the space between the edges of the recess 51a of the molded base 51 and the colored rubber layer 53b, and if it is molded as it is, tongue-shaped portions will remain as shown in FIG. 6, and this is undesirable from the viewpoint of designing.

FIG. 4 denotes an original holder plate of this invention, wherein the periphery of a molded base 41 with a flat recess 41a is surrounded by a projecting rim 41b and a flat molded cover 42 is mounted. To prepare said original holder plate, first, a blended rubber consisting of raw rubber with a vulcanizer and white pigment, flexible white synthetic resin or the like is poured into the flat recess 41a surrounded by the projecting rim 41b, as a layer 43a on the holding side, and then a blended rubber composed of raw rubber and a vulcanizer is poured over the white layer 43a as the outer layer 43b of said original holder plate. These layers 43a and 43b are covered with the molded cover 42, and vulcanized and molded, whereby an original holder plate is formed. Since the white layer 43a on the holding surface side is partitioned with the projecting rim 41b, it will never flow over into the colored layer 43b outside the projecting rim 41b even it it is pressurized at the time of vulcanization and molding.

The original holder plate 8 shown in FIG. 2 is thus obtained, and the layer 8b on the outer side and the layer 8c with a white mat surface on the holding side are sharply separated by a closed groove 8d formed corresponding to the projecting rim on the molded base. As can be seen clearly in FIG. 3, the white layer 8c on the holding side only slightly intrudes into the layer 8b on the outer side over the closed groove 8d. Here, the recess on the molded base is designed so that its size and shape may be sufficient to form a holding surface of an original holder plate, and the holding side of the plate can be finished as a mat surface, that is, a coarse surface suitable for reflecting light diffusely. It is needless to say that synthetic rubber or synthetic resin may be used for both of said layers 8b and 8c as well as natural rubber.

Further, the original holder plate 8 according to this invention can also be obtained in the following way. In FIG. 9, a molded base 16 is equipped with small projections 16a, a layer 17 made of blended rubber or flexible synthetic resin is cast in the molded base 16, a layer of a flexible padding material 13 is buried in the layer 17 and supported by said projections 16a and a molded cover 14 is mounted on the top. The layer 17 is vulcanized and cast with the layer 13 buried inside, and is made into a plate 15 (FIG. 8). Said layer 17 may be made of blended rubber composed of natural or synthetic raw rubber blended with a vulcanizer and others, and said layer of a flexible padding material 13 may be a flexible metal plate, metal wire or wire-netting. When vulcanization and molding is finished, the layer 13 is bent in the direction shown by an arrow a together with the plate 15, forming a handle 8a. The plate 15 thus formed works as an original holder plate 8. In FIG. 8, holes 15a are created corresponding to the projections 16a. The molded base 16 is designed in advance so that the holder plate 8 of a required size and shape may be obtained. Thus the original holder plate 8 and the handle 8a are formed integrally in this invention, it is not necessary to attach a separate metal handle or equivalent to the holder plate 8.

Further, one end of an original holder plate 8 is molded a little thicker than the other part of the plate, and on both sides of said end of the plate, protruding shafts 9 and 10 are embedded in the plate as one body. This original holder plate 8 is attached to a copying machine with these two protruding shafts 9 and 10 coupled with fixed bearings 11 and 12 on the top panel 1a of the copying machine 1 (FIG. 1). The flexibility of the original holder plate between two protruding shafts 9 and 10 is not affected and kept as it is, and it is easy to mount the original holder plate to the copying machine and detach it therefrom by bending the plate as shown in FIG. 9. Said protruding shafts 9 and 10 may be molded integrally when the original holder plate is molded.

As described above, in the method according to this invention, the layer on the outer side of the original holder surface and the white layer on the holding side are formed integrally, and unnecessary parts of the white layer are not exposed. Further, since the original holder plate according to this invention can easily be mounted and detached in the copying machine, it is convenient to clean the holder plate. Further, since the original holder plate and the handle thereof are formed integrally, it is not necessary to attach a separate metal handle to the original holder plate and both of an original or the top panel of the copying machine housing might not be damaged by the metal handle. Therefore, an ideal original holder plate from the standpoint of designing and function can easily be manufactured by a simple process.

What is claimed is:

1. An original holder plate for copying machines comprising a first layer formed of a flexible material selected from the group consisting of blended rubber and flexible synthetic resin, a second layer of flexible material covering said first layer and extending beyond the edges thereof so as to form an outer side of said plate and being provided with an annular groove surrounding the periphery of said first layer, and a molded cover mounted to cover said first and second layers on the side of said second layer opposite said first layer, said first and second layers and said molded cover being vulcanized.

2. An original holder plate for copying machines comprising a plate made of rubber or synthetic resin, and a flexible padding material buried in one end of said holder plate made of rubber or synthetic resin which is bent together with said surrounding plate into the form of a handle.

3. An original holder plate for copying machines comprising a flexible body, and oppositely directed protruding shafts embedded and molded integrally on respective sides of one end of said flexible body of said holder plate, which is made of rubber or synthetic resin, so that said body may be flexed to draw said protruding shafts toward one another when inserting said shafts in fixedly spaced supporting elements.

* * * * *

UNITED STATES PATENT OFFICE
CERTIFICATE OF CORRECTION

Patent No. 3,682,548     Dated August 8, 1972

Inventor(s) Shigeru Suzuki

It is certified that error appears in the above-identified patent and that said Letters Patent are hereby corrected as shown below:

Issue date of patent incorrect. Should read:

--August 8, 1972--;

Priority data incomplete. Should read:

--45605/69    Japan      June 10, 1969
          54389/69    Japan      June 10, 1969
          54390/69    Japan      June 10, 1969--

Signed and sealed this 20th day of November 1973.

(SEAL)
Attest:

EDWARD M. FLETCHER, JR.                RENE D. TEGTMEYER
Attesting Officer                      Acting Commissioner of Patents